United States Patent
Ando et al.

(10) Patent No.: US 7,190,770 B2
(45) Date of Patent: Mar. 13, 2007

(54) METHOD AND SYSTEM FOR ACQUIRING INFORMATION WITH VOICE INPUT

(75) Inventors: Haru Ando, Kodaira (JP); Yoshito Nejime, Koganei (JP); Junichi Matsuda, Higashimurayama (JP)

(73) Assignee: Hitachi, Ltd., Tokyo (JP)

( * ) Notice: Subject to any disclaimer, the term of this patent is extended or adjusted under 35 U.S.C. 154(b) by 449 days.

(21) Appl. No.: 10/206,231

(22) Filed: Jul. 29, 2002

(65) Prior Publication Data

US 2003/0156689 A1 Aug. 21, 2003

(30) Foreign Application Priority Data

Feb. 21, 1980 (JP) ............... 2002-040434

(51) Int. Cl.
H04M 1/64 (2006.01)
G10L 15/00 (2006.01)

(52) U.S. Cl. ............... 379/88.01; 379/88.16; 704/231; 704/270

(58) Field of Classification Search ......... 379/88.01, 379/88.02, 88.03, 88.04; 704/231, 246, 251, 704/270
See application file for complete search history.

(56) References Cited

U.S. PATENT DOCUMENTS 5,168,548 A * 12/1992 Kaufman et al. ....... 379/88.01
6,910,003 B1 * 6/2005 Arnold et al. ............ 704/4
7,047,195 B2 * 5/2006 Koizumi et al. ........ 704/260
2003/0033312 A1 * 2/2003 Koizumi et al. ........ 707/100
2004/0008182 A1 * 1/2004 Weil et al. .............. 345/156

FOREIGN PATENT DOCUMENTS

| JP | 05-041894 | 2/1993 |
| JP | 08-223309 | 8/1996 |
| JP | 10-026997 | 1/1998 |
| JP | 2001-075593 | 3/2001 |

\* cited by examiner

*Primary Examiner*—Ovidio Escalante
(74) *Attorney, Agent, or Firm*—Mattingly, Stanger, Malur & Brundidge, P.C.

(57) ABSTRACT

A user-requested command with both visual and hearing information is indicated. Additionally, with a user friendly method, the user understands what content to input. The user-requested command is expressed in the form of a template sentence. Template part in the template sentence is vocalized, and a slot area in the template sentence is expressed using a sound or voice. The user inputs his or her voice to be input to the slot area.

11 Claims, 13 Drawing Sheets

Fig. 4

| Template-sentence identifiers (4001) | Template sentences (4002) | | Slot word category names (4003) | Slot words (4004) | Sound types for slot areas (4005) | Time lengths for slot areas (4006) |
|---|---|---|---|---|---|---|
| A | Visiting [A1] | A1 | Facility name | Tennis court | sound_a | 300msec |
| B | Canceling reservation for [B1] | B1 | Facility name | Gym | sound_a | 300msec |
| C | Checking availability for [C1] | C1 | Facility name | Gym | sound_a | 300msec |
| D | Reserving [D2] at [D1] | D1 | Block number, town name | Yayoi-higashi cho 3-chome | sound_b | 1000msec |
|  |  | D2 | Facility name | Gym | sound_a | 300msec |
| -- | -- |  |  |  | -- | -- |
| W | Input [W1] | W1 | Block number, town name | Yayoi-higashi cho 3-chome | sound_b | 1000msec |
|  |  |  | Facility name | Gym | sound_a | 300msec |
|  |  |  | Block number | 3-chome | sound_b | 300msec |

Fig. 5

| Template sentence sub unit number array | Word_0 | Word_1 | Word_2 | Word_3 |
|---|---|---|---|---|
| Slot area item number | S_0 | | S_1 | |
| Template area item number | | T_0 | | T_1 |
| Sub template sentence unit | [D1] | at | [D2] | reserving |

Fig. 6

| Unit numbers (6001) | Word names (6002) | Word category names (6003) |
|---|---|---|
| 0 | Yayoi-higashi cho 4-chome | Block number, town name |
| 1 | Yayoi-higashi cho 3-chome | Block number, town name |
| 2 | 3 hon chou | Town name |
| 3 | Yayoi minami chou | Town name |
| 4 | 4-chome | Block number |
| ⋮ | ⋮ | ⋮ |
| 20 | Gym | Facility name |
| 21 | Tennis court | Facility name |
| 22 | Ground | Facility name |
| | | |

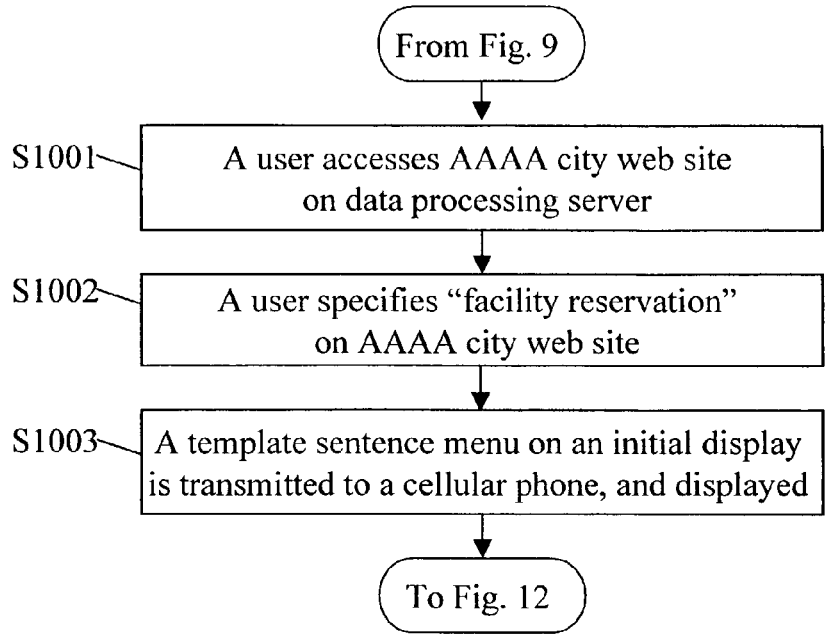
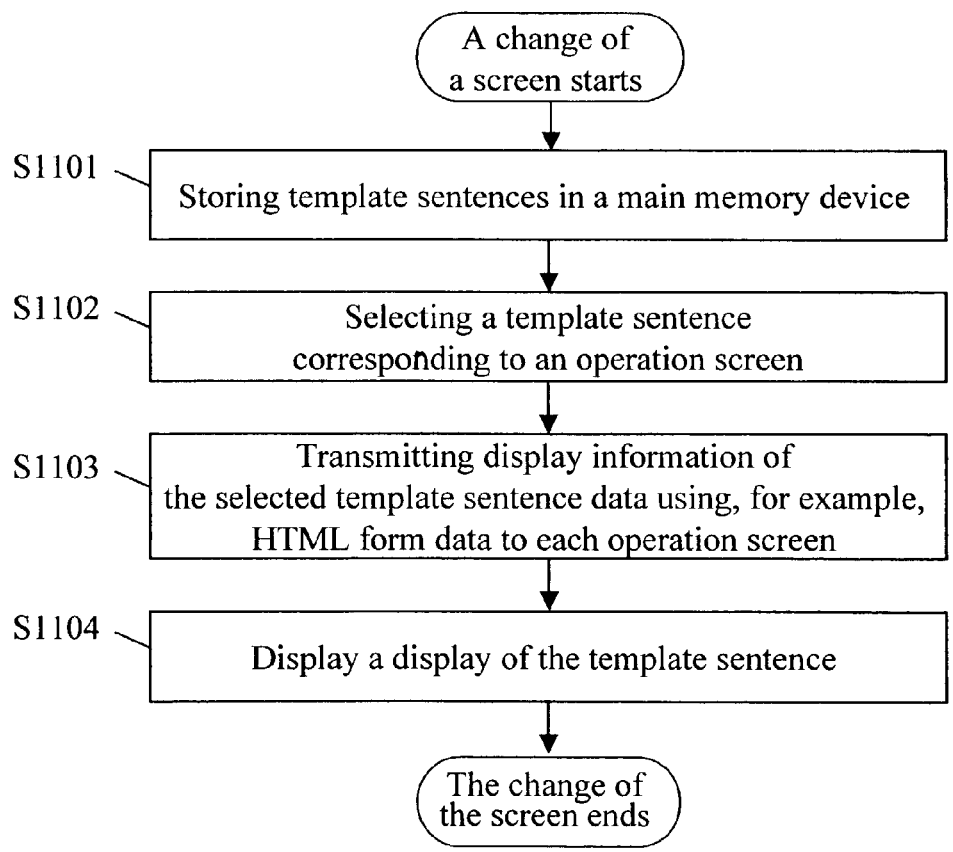

METHOD AND SYSTEM FOR ACQUIRING INFORMATION WITH VOICE INPUT

BACKGROUND OF THE INVENTION

1. Field of the Invention

The present invention relates to a user interface using voice input and output means and an information processing system containing the user interface.

2. Description of the Related Art

Recently, for promoting universal design, the services for both old/handicapped and normal persons tend to be structured rather than old/handicapped person-only services so that the old/handicapped persons can receive the same services as the normal persons. However, there are few devices oriented to the universal design. Many blind persons use cellular phones. Since a user interface of a current cellular phone is structured for the normal persons, the blind persons have the difficulty to use functions of the cellular phone efficiently, and thus use only the call function. Many old persons also use a cellular phone because of its convenience in cases of emergency and going away. They have the difficulty to use many functions of the cellular phone, and thus use only the call function. Since the cellular phone has a small display because of the limitation of its body size, the old persons have trouble seeing the display, and thus cannot often acquire screen information distributed over the Internet. Almost everyone feels the stress of seeing small characters on the small display.

A device needs not only a screen display but a user interface using voice input and output so that old/handicapped persons acquire the same amount and quality of information as normal persons. Current devices cannot recognize any voice correctly. When a user inputs information to the device, a user interface that brings the user less burden and keeps high recognition for the voice input should be structured.

When a user inputs information through a user interface using voice information, the user can understand what to input and what information is suitable without viewing a small screen display in detail.

There are two types of user interfaces using voice information. One is a user interface that vocalizes both its options and their numbers and makes the user select the option number. The other is a user interface that prompts voice input of the user with voice dialogue. The former cannot meet a situation that the there are many options or that the options cannot be prepared previously. The latter cannot correctly indicate to the user what to input and thus cannot acquire required input contents, or cannot process unexpected voice input of the user.

OBJECT AND SUMMARY OF THE INVENTION

To solve the problems of the above-described prior art, the present invention provides a user interface that correctly indicates to a user what to input and that uses sound information realizing high recognition of the contents of voice input.

To carry out the invention, one preferred aspect is so structured that a template sentence, part of which can be replaced, for example, with words, is produced to be indicated to a user what content to input, template areas of the template text sentence are vocalized, and slot areas of the template sentence are expressed by sounds or voices. The slot area of the template sentence is an empty space in the template sentence, which is filled with information of voice input by the user.

When the user can select a command and set a parameter of the selected command freely, the user can save the trouble of thinking what content to vocalize. Therefore, means in which the user selects one of the plurality of template sentences indicated with sound output by operating, for example, a button, and inputs contents for the slot areas of the selected template sentence by using voice input, is provided.

Normal persons can see text information of a screen display, but under a particular condition, they cannot see it clearly. Therefore, means in which the normal persons can confirm the template sentence information with sound output, and additionally select a template sentence for the user-requested command from the screen display on which plural template sentences are displayed, is also provided.

The voice input is used as information input for the slot areas. When the user is previously aware of a length of a word to be vocalized for the slot area, the possibility that a word corresponding to the slot area is input becomes high. Therefore, means for controlling a time length of a sound or voice which is expressed corresponding to a time length of the word to be vocalized for the slot area, is provided.

A system structured so as to recognize not only user's voice input for the slot areas but voice input of contents including part of the template sentence permits voice recognition even when the user vocalizes the whole template sentence. Therefore, there is provided means for efficiently acquiring information for the slot areas from information vocalized by the user. In addition, there is provided a function for judging slot contents by collating an order of plural the voice information input by the user and an order of the slot areas, so as to comprehend correspondence between plural voice information input by the user and the slot areas. Further, there is provided a function for judging whether categories of the voice input information respectively correspond to the contents to be input to the slot areas, so as to judge whether the voice information are sequentially input according to the order of the slot areas.

In another aspect, an information acquiring method with voice input has the steps of:

outputting a template sentence including a slot area as sound data voice-synthesized by replacing the slot area with a sound of a predetermined time length;

receiving voice data;

converting the received voice data to a character string through a voice recognition process; and acquiring a word corresponding to the slot area from the character string.

In still another aspect, the information acquiring method with voice input has the steps of:

receiving an instruction to select one of plural template sentences including slot areas, the template sentences being stored in a memory device;

producing voice-synthesized sound data by replacing the slot areas of the selected template sentence with sounds of predetermined time lengths;

transmitting the produced sound data;

receiving voice data;

converting the received data to a character string though a voice recognition process; and acquiring words corresponding to the slot areas from the character string;

The sound may be superposed by a sample of a word to be input to the slot area. The synthesized voice for the template sentence is output after the slot area is replaced with the sample of the word for the slot area so that the user can understand correctly what content to input.

The time length of the sound replacing the slot area may vary according to the slot area. The time length of a sound or voice to be expressed for the slot area is controlled according to a time length of information to be input to the slot area, so that the user can guess a voice time length of a word to be input, and specify the word information without a special awareness.

Further, the slot area may be provided with category as an attribute, and thereby allowing a word corresponding to the slot area to be acquired when the category of the slot area matches the category of the word in the character string. With this method, when plural slot areas exist in a template sentence, the slot areas corresponding to respective input voice information can be specified according to categories of the input voice information. When all required information has not yet been input, a template sentence showing what data to input is produced, and sound and voice data of the template sentence is indicated to the user, so that the user can input only required information.

In yet another aspect, an information acquiring system with voice input has:

storing means for storing plural template sentences that include the slot areas, and data corresponding to the slot areas;

voice synthesizing means for converting a template sentence to sound data by replacing the slot area of the template sentence with the data corresponding to the slot area;

transmitting means for transmitting the sound data;

receiving means for receiving data;

voice recognizing means for converting the voice data received by the receiving means to a character string; and word acquiring means for acquiring words corresponding the slot areas of the transmitted template sentence from the character string.

Data corresponding to the slot area can be sound data of a predetermined time length, or a sample of a word to be input to the slot area and sound data of a predetermined time length superposed by the sample.

With regard to the word acquiring means, there may be provided a word dictionary that registers words corresponding to slot areas and allowing the means to acquire words corresponding to the slot areas by collating words in the character string with the words registered in the word dictionary. With this system, when the user inputs not only contents to be input to the slot areas, but the vocalized whole template sentence or part of the template sentence, information only for the slot areas can be acquired, increasing a degree of freedom of voice input by the user.

The word acquiring means may be so structured that data corresponding to the slot areas are provided with word categories, and the word dictionary is provided with data of the word categories. Words for the slot areas can be acquired also by collating word categories of the slot areas with the categories of words in the character string. With this system, when plural slot areas exist in a template sentence, the slot areas corresponding to respective input voice information can be specified with the category information of the input voice information. When all the required information is not input, a template sentence showing the user what data to input is produced, and sound and voice data of the template sentence make the user input only required information.

Information can be easily input and output with a voice by using a "template sentence" representing an intention of the user, according to the present invention.

Other and further objects, features and advantages of the invention will appear more fully from the following description.

BRIEF DESCRIPTION OF THE DRAWINGS

FIG. 4 is an example of a configuration of a template sentence.

FIG. 5 is an example showing sub units and slot areas of the template sentence, and showing item numbers of the template areas.

FIG. 6 is an example of a configuration of a word dictionary.

FIG. 10 is an example of a flowchart of a process according to the present invention.

FIG. 11 is an example of selecting a template sentence from template sentence data during a screen change.

DETAILED DESCRIPTION OF THE PREFERRED EMBODIMENTS

Embodiments

Preferred embodiments of the present invention will be described in the following in reference with the appended drawings. Described is a case that a user accesses a web site of AAAA City, and reserves a tennis court at Yayoi-Higashi cho 4-chome AAAA City from 10:00 to 16:00 on May 15 for four persons. Although a case that a user accesses a web server to reserve a public facility with a mobile device such as a cellular phone is mentioned here as one embodiment of the present invention, the embodiments of the present invention are not limited to information output/input between a mobile phone and a web server.

Figure 1:
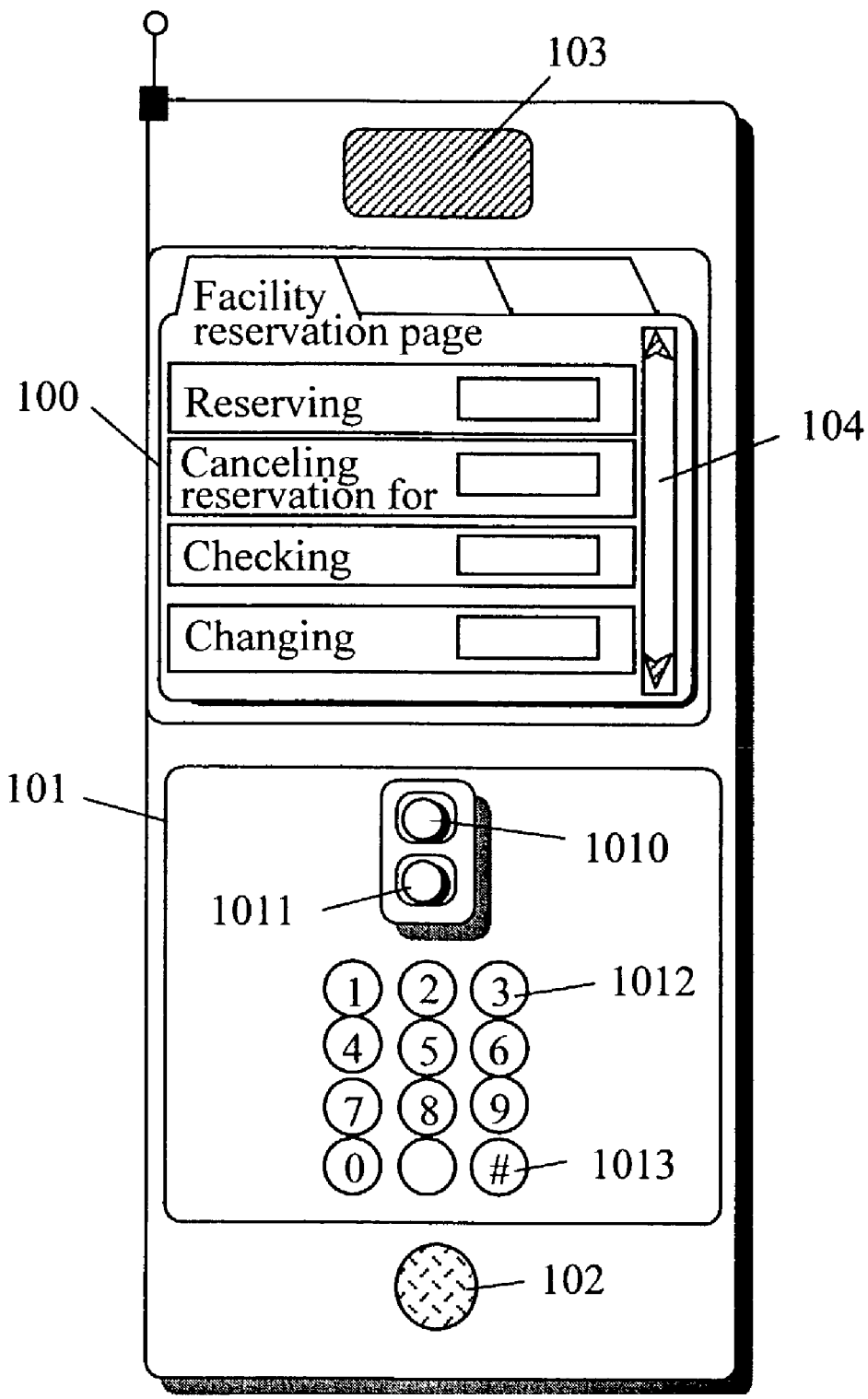
FIG. 1 is an example of a display screen of a cellular phone.

FIG. 1 shows an example of a screen display of a cellular phone used by a user for information input/output in the present embodiments. The cellular phone comprises a screen display portion 100, an operating button panel portion 101, a voice input microphone 102, and voice output speaker 103. When all contents cannot be displayed on the screen display portion 100, requested contents can be displayed by scrolling the screen with a scroll bar 104. The operating button panel portion 101 is provided with menu selecting buttons 1010 and 1011, number buttons 1012, and other buttons 1013. In this embodiment, an initial screen of a facility reserving system used by the user is a first screen of "a facility reserving page" on the screen display portion 100 of FIG. 1, where a template sentence menu including "reserving _____" and "canceling reservation for _____" is displayed.

Figure 2:
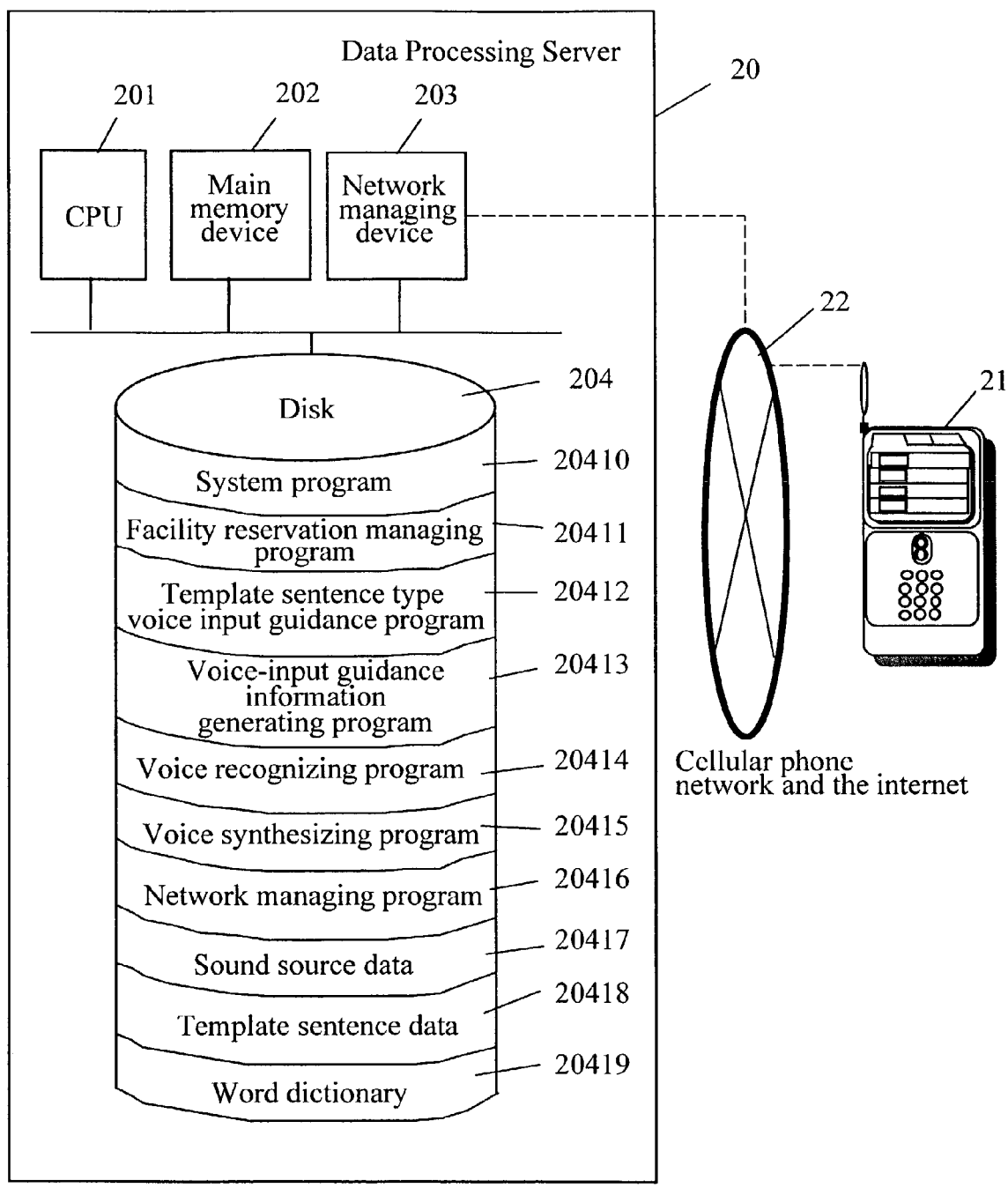
FIG. 2 is a block diagram showing an example of a configuration of a data processing server according to the present invention.

FIG. 2 is a block diagram showing an example of a structure of a data processing server according to the present invention. The data processing server 20 in this embodiment is a web server. The cellular phone 21 and data processing server 20 used by the user for inputting and outputting information are connected via a communication network 22 such as a cellular phone network and the Internet. The cellular phone 21 may be replaced with other mobile devices such as potable terminals.

The data processing server 20 comprises a CPU 201 that processes in response to an activated program, a main memory device 202 that stores, for example, a program activated by a CPU, a network managing device 203 that manages and controls information of a network such as telecommunications lines, and a disk 204. The disk 204 stores a system program 20410 that controls a whole system, a facility reservation managing program 20411, a template sentence type voice input guidance program 20412, a voice-input guidance information generating program 20413, a voice recognizing program 20414, a voice synthesizing program 20415, and a network managing program 20416, and stores, as its own database, sound source data 20417, template sentence data 20418, and a word dictionary 20419. The sound source data 20417 stores sound data and sound source data for synthesizing voice. A program to be executed and data to be accessed, if necessary, are loaded on the main memory device 202, and data-processed by the CPU 201 according to the present invention. In this embodiment, the cellular phone 21 is a multi-access type cellular phone capable of transmitting and receiving the voice data and the Internet data simultaneously.

A process of this embodiment will be described in reference with flowcharts of FIGS. 9 to 16.

Figure 9:
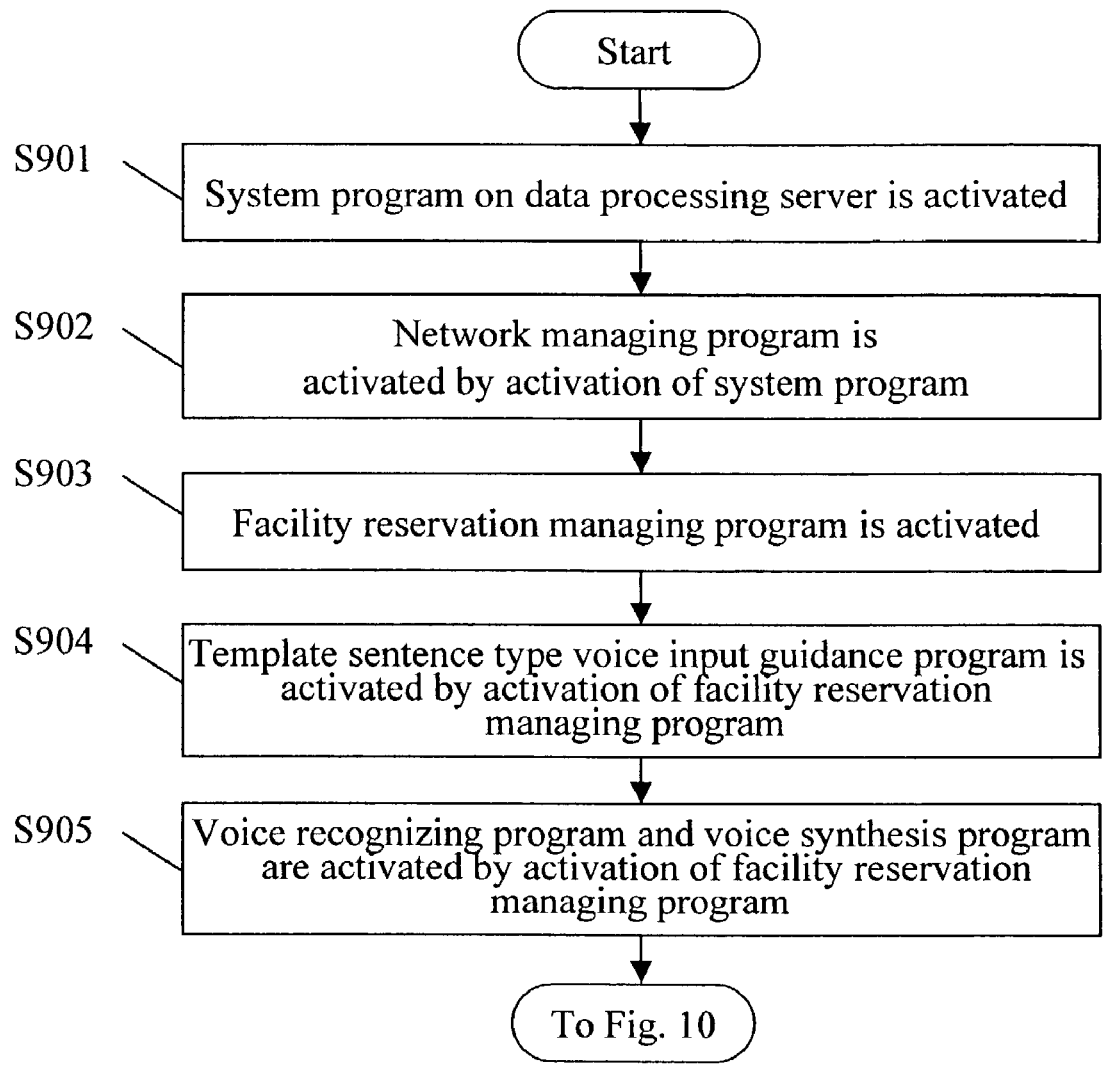
FIG. 9 is an example of a flowchart of a process according to the present invention.
Figure 12:
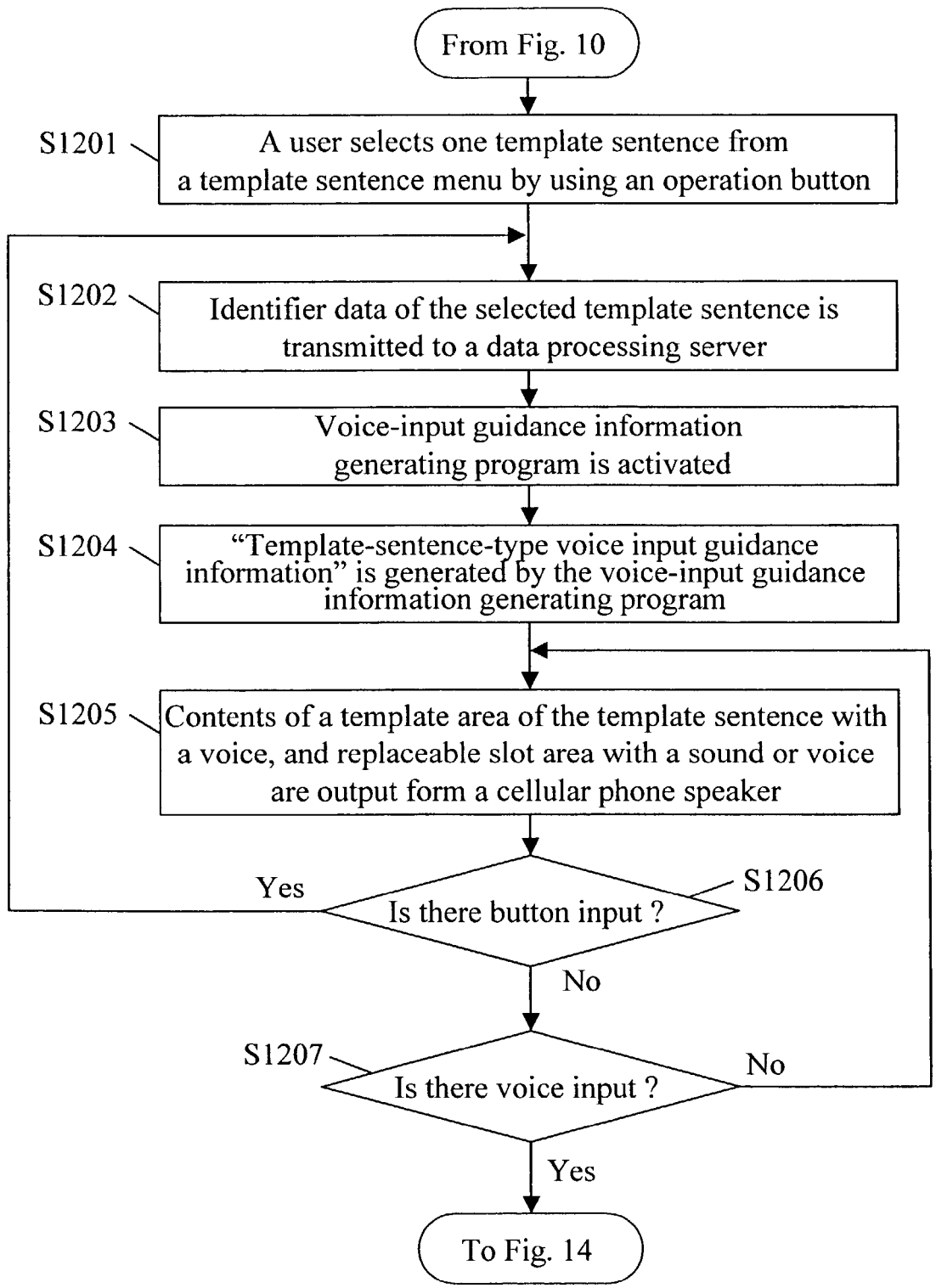
FIG. 12 is an example of a flowchart of a process according to the present invention.

First, as shown in FIG. 9, a facility reserving system manager activates the data processing server 20. When the manager activates the system program 20410 (S901), the network managing program 20416 starts (S902). When the manager activates the facility reservation managing program 20411 (S903), the template sentence type voice input guidance program 20412 starts (S904), and the voice recognizing program 20414 and the voice synthesis program 20415 start (S905). These programs are stored in the main memory device 202 of the data processing server 20.

Figure 3:
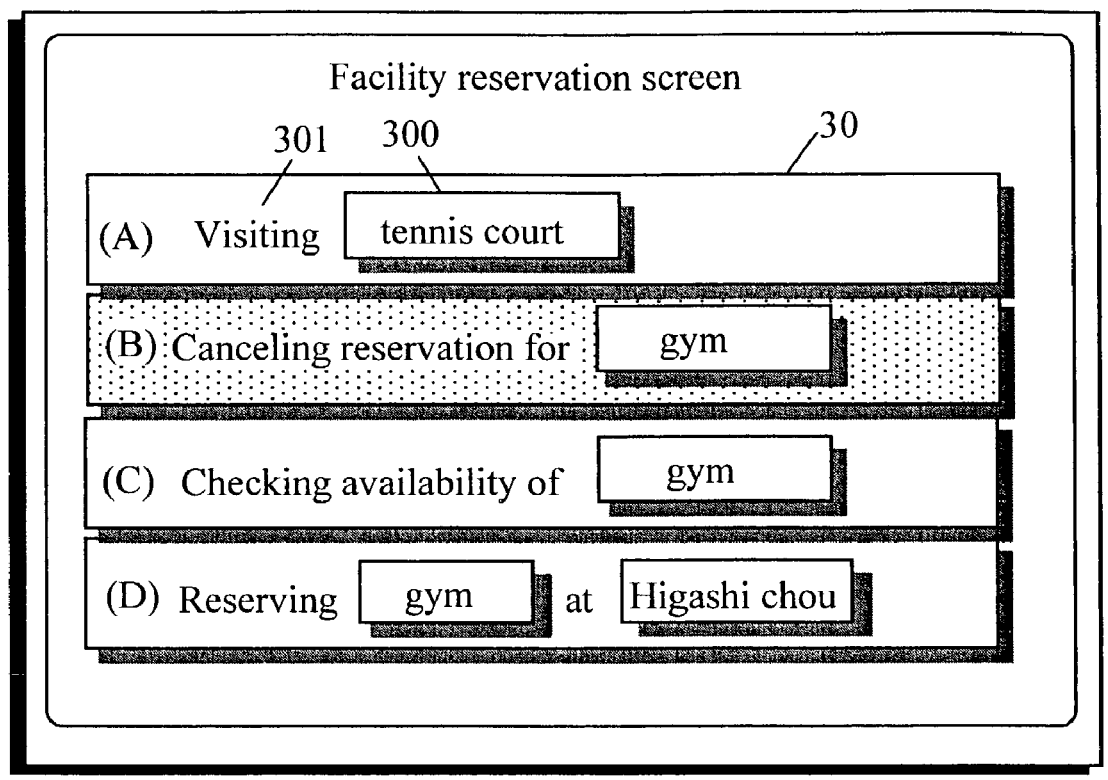
FIG. 3 is an example of a menu display screen.

In this point of time, the cellular phone 21 can access the data processing server 20. When the user accesses a web site of AAAA City on the data processing server 20 through, for example, the cellular phone 21 (S1001), and selects "facility reservation" on the web site (S1002), the template sentence type voice input guidance program 20412 transmits a screen display information to the cellular phone 21 through the cellular phone network. Then, as shown in FIG. 3, template sentence menu information of the initial screen is displayed on the screen display portion 100 of the cellular phone 21 (S1003).

The template sentence type voice input guidance program 20412 makes the main memory device 202 store template sentence group for the display, from the template sentence data 20418 (S1101). A template sentence for each operation is selected from the template sentence data 20418 (S1102). Next, for example, HTML form data for displaying the selected template sentence are transmitted to the cellular phone 21 (S1103), and the template sentence is displayed on the screen display portion 100 by using the HTML form data (S1104).

A configuration of each template sentence will be described here. For example, a template sentence (A) is configured with "visiting" and "tennis court". The "tennis court" area is sample information to be input by the user, and a variable area (hereinafter called a slot area) 300. The "visiting" area is a template portion (hereinafter called a template area) 301, representing a user's purpose.

Next, an example of data structure of the template sentence data 20418 will be described in reference with FIG. 4. Template sentences 4002 respectively correspond to template-sentence identifiers 4001, which are managing numbers for the template sentences 4002. The template sentences 4002 have data corresponding to slot areas ([A1], [B1], [C1], [D1], [D2]. . . [W1]) in the template sentences 4002, respectively.

For example, in a template sentence (D), "block number, town name" corresponding to [D1] and "facility name" corresponding to [D2], which are category names of words to be expressed for the slot areas, are stored as slot word category names 4003. In addition, slot words 4004 corresponding to the slot word category names 4003 are stored. For example, "Yayoi-Higashi cho 3-chome" corresponding to "block number, town name" of [D1] and "gym" corresponding to "facility name" of [D2] are stored. Further, slot area sound types 4005 correspond to the slot word category names 4003. The sound type "sound_a" corresponding to the category name "facility name" and the sound type "sound_b" corresponding to the category name "block number, town name" are stored. Furthermore, time lengths required for speaking for the respective slot words are stored as slot area time lengths 4006. The time length for "3 Yayoi Higashi cho" of [D1] is 1,000 msec, and the time length for "gym" of [D2] is 500 msec.

Each of the template sentences 4001 comprises sub units. As shown in FIG. 5, each template area and slot area in a template sentence is expressed as the sub unit. A time-series number for the each sub unit is Word_i (i=0 . . . n, a slot area item number for the each sub unit is S_j (j=0 . . . m), and a template area item number for the each sub unit is T_k (k=0 . . . s).

Input operations by the user will be described in the following. The present invention is available regardless of whether a screen display is provided. The present embodiment refers to a situation that the screen display is provided.

In the initial screen of FIG. 3, the user selects a template sentence representing the user's purpose from the template sentence menu 30 by using the menu selecting buttons 1010 and 1011 of the cellular phone of FIG. 1 (S1201). When the selecting button 1010 is pressed, a template sentence (A) immediately above a template sentence (B) will be highlighted to be positive instead of the template sentence (B) currently highlighted. When the selecting button 1011 is pressed, a template sentence (C) immediately below the template sentence (B) will be highlighted to be positive instead of the template sentence (B) currently highlighted. Identifier data of the positive template sentence is automatically transmitted from the cellular phone 21 to the data processing server 20 (S1202).

For example, when a template sentence "D" is selected, and template-sentence identifier data "D" is transmitted to the data processing server 20, the voice-input guidance information generating program 20413 is activated (S1203). The program 20413 generates "template-sentence-type voice input guidance information" that prompts the user's voice input by using information which correspond to the template-sentence identifier data "D" and exist in the template sentence data 20418 (S1204). The generated template-sentence-type voice input guidance information is transmitted to the cellular phone 21, and output from a speaker of the cellular phone (S1205).

When the menu selecting button 1010 or 1011 is pressed again, step 1206 returns to step 1202 in which selected identifier data is transmitted to the data processing server 20. Like this, every time that the template sentence is selected, the template-sentence identifier data 4001 is transmitted to the data processing server 20. In other words, every time that the user selects another template sentence from the menu by pressing the menu selecting button 1010 or 1011, identifier data of the selected template sentence is automatically transmitted to data processing server 20, and thereby the selected template sentence is vocalized. Therefore, the user can select the user-requested menu according to only the voice output without viewing the screen of the cellular phone 21.

Before step 1201 goes to step 1202, a button operation for deciding the selection can be also provided. In this case, after the menu is selected in step 1201, a decision button (e.g., "#" button 1013) is pressed for deciding the selection, and then step 1201 goes to step 1202, in which template-sentence identifier data 4001 of the selected template sentence is transmitted from the cellular phone 21 to the data processing server 20.

Figure 14:
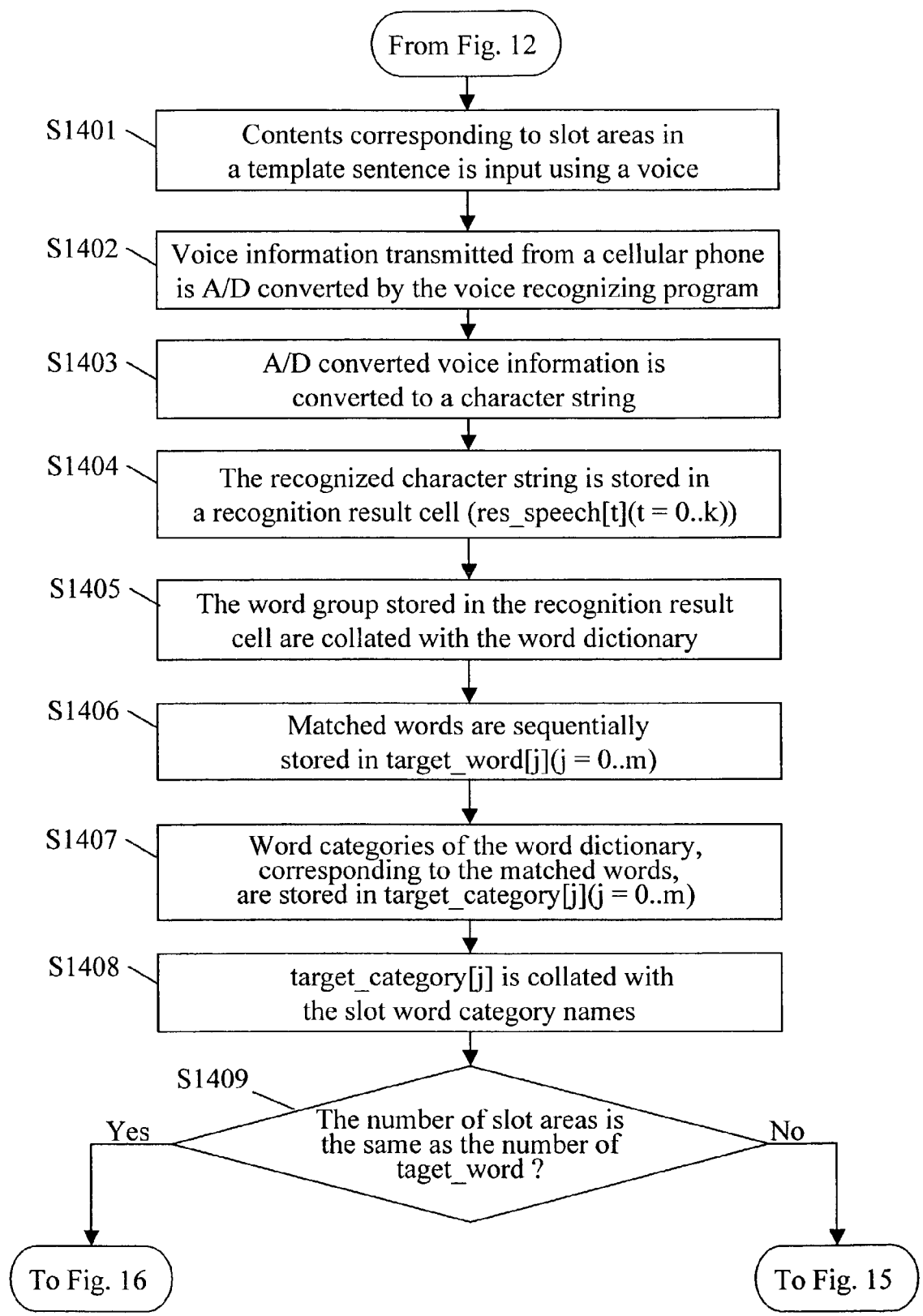
FIG. 14 is an example of a flowchart of a process according to the present invention.

When there is no button input after a voice of the selected template sentence is output from the speaker of the cellular phone 21 in step 1205, and there is voice input in step 1207, step 1207 goes to a process of FIG. 14. When there is no voice input in step 1207, step 1207 loops to step 1205, in which the guidance information is output from the speaker again.

Figure 13:
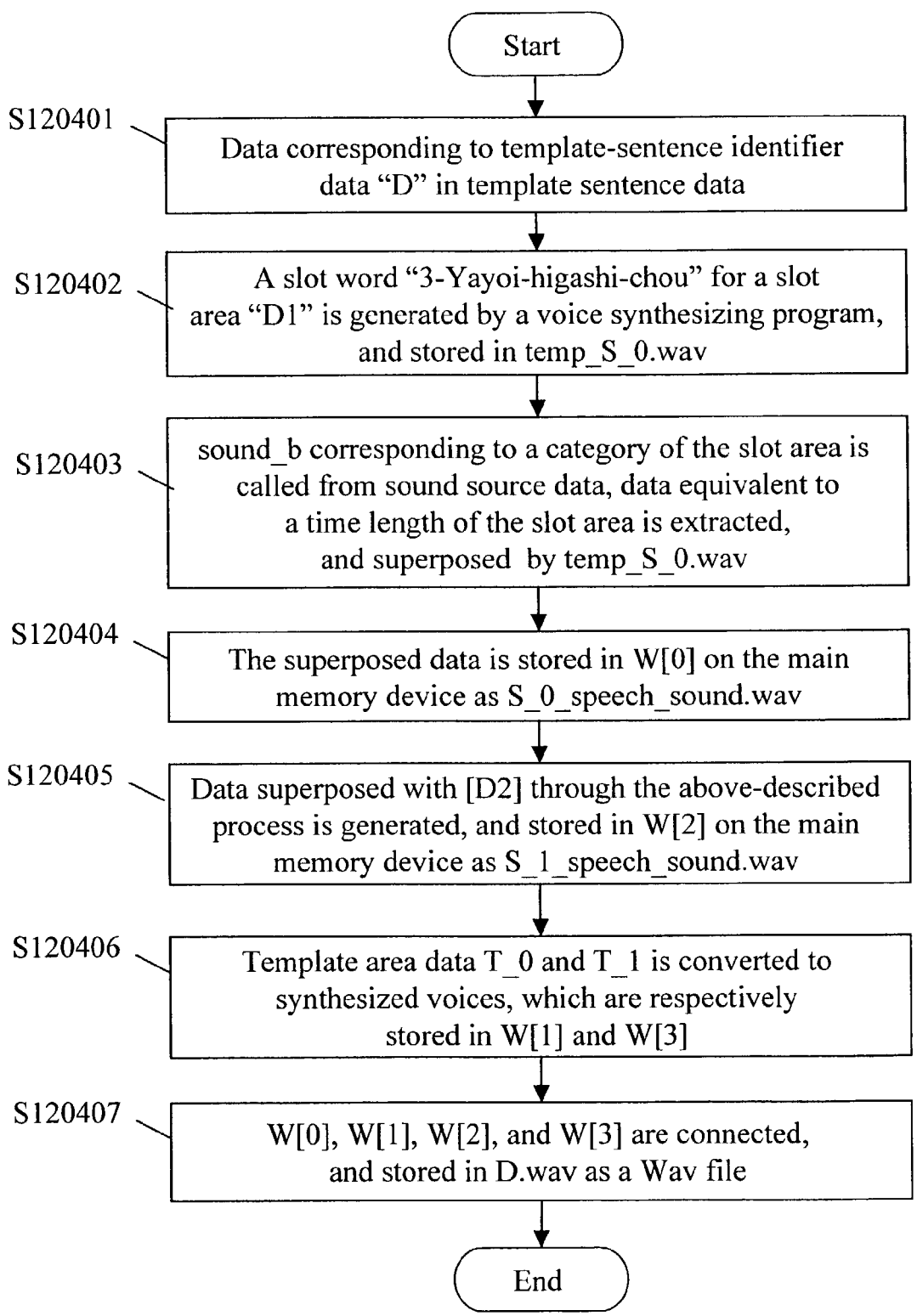
FIG. 13 is a flowchart showing an example of generating template sentence type sound and voice guidance information.

A process of generating the template-sentence-type voice input guidance information in step 1204 when the template sentence "D" is selected, will be described in detail in the following in reference with FIG. 13.

When the data processing server 20 receives the template-sentence identifier data [D] via the network managing device 203, the voice-input guidance information generating program 20413 activated by a trigger of the reception operates so that data in the template sentence data 20418, corresponding to the template-sentence identifier data "D", is stored in the memory (S120401). Additionally, the voice synthesizing program 20415 is activated so that output voices of the slot areas [D1] and [D2] in the template sentence "D" are generated.

FIG. 5 shows a process of generating an output voice of S_0, a sub unit of a template sentence corresponding to the slot area [D1]. First, the voice synthesizing program 20415 operates so that the slot word "3-Yayoi-Higashi-cho" corresponding to S_0 is converted to a synthesized voice, and then stored in temp_S_0.wav file (S120402). Next, a sound type "sound_b" of the slot area corresponding to the facility name category is called from the sound source data 20417. Sound data of a time length of 1,000 msec described in the slot area time lengths 4006 are extracted from sound source data "sound_b.wav" corresponding to "sound_b". The extracted sound data superposes temp_S_0.wav (S120403).

The superposed sound voice data is stored in an array of W[0] in the main memory device 202 as a file S_0_speech_sound.wav (S120404). Sound data of a time length of a slot word "gym" corresponding to S_1 of [D2] are extracted from a wav file "sound_a.wav" corresponding to "sound_a" stored in the sound source data 20417, and superpose the slot word "gym". This superposed data are stored in the W[2] array in the main memory device 202 as S_1_speech_sound.wav (S120405).

A process of generating synthesized voices of template areas T_0 ("at") and T_1 ("reserving") will be described in the following. A synthesized voice for "at" of T_0 is generated by the voice synthesizing program 20415, and then stored in the array W[1] of the main memory device 202 as a wav file. A synthesized voice for "reserving" of T_1 is generated by the voice synthesis program 20415, and then stored in the array W[3] of the main memory device 202 as a wav file (S120406).

Lastly, W[0], W[1], W[2], and W[3] are connected, and then stored in D.wav as a wav file (S120407). As described above, in step 1205 of FIG. 12, the D. wav is transmitted to the cellular phone, and output from the speaker of the cellular phone as voice input guidance information of the output sound file D.wav.

A slot area sound not superposed by a synthesized voice for a slot word can be also used as the output sound file. In this case, the sound source data sound_a and sound_b which are specified in the slot area sound types 4065 and have time lengths shown in the slot area time lengths 4006 are extracted, and then stored in S_0_speech_sound.wav and S_1_speech_sound.wav, respectively.

Sounds such as a chime and a beep can be used as the sound source data "sound_a.wav" and "sound_b.wav". The synthesized voices of the template areas T_0 ("at") and T_1 ("reserving") may be different from those of the slot areas [D1] and [D2] in frequency bands, so that the user can easily understand what to input, and give attention to the voices without feeling harshness.

A process of voice input by the user to the slot areas in the template sentence will be described in the following with reference to FIGS. 14 to 16. After the voice input guidance information of the output sound file D.wav is output from the speaker, the user inputs contents corresponding to the slot areas in the template sentence by using his/her voice. For example, when the template sentence (D), "reserving [D2] at [D1]", is selected, words corresponding to [D1] and [D2] are inputted. A word such as "tennis-court" or "playground" is input to the slot area [D2], and a word such as "Minami-cho" or "Kita-machi" is input to the slot area [D1], through a voice input device such as a microphone of the cellular phone (S1401). An A/D conversion of the input voice information is done by the voice recognizing program 20414 (S1402). The digitalized voice information is converted to a character string having word units (S1403). The recognized character string is stored in a recognition result cell. In this embodiment, the user says "tennis court at Yayoi-Higashi cho 4-chome", and the three words "tennis-court", "at", and "Yayoi-Higashi cho 4-chome" are stored in the recognition result cell (res_speech[t] (t=0 . . . k) (k=2)) as the recognition result.

Next, "tennis-court" of res_speech[2], "at" of res_speech[1], and "Yayoi-Higashi cho 4-chome" of res_speech[0] are collated with the word names in the word dictionary 20419 (S1405). As shown in FIG. 6, the word dictionary 20419 is configured with word numbers 6001, word names 6002, and word categories 6003. As a result of the collation, "res_speech[0]" and res_speech[2] match the word names, and are sequentially stored in target_word[j] (j=0 . . . m) as the matched words (S1406). In this case, target_word [0] is "Yayoi-Higashi cho 4-chome", and target_word [2] is "tennis court".

The word category names in the word dictionary 20419, corresponding to the matched words, are stored in target_category[j] (j=0 . . . m) in the main memory device 202 (S1407). In this case, target_category[0] is "block number, town name", and target_category[2] is "facility name". Since there is no category name for "at" of res_speech [1], "0" is stored in target_category [1].

Additionally, target_category[j] is collated with the slot word category names (See FIG. 4) in the template sentence data 20418. In this case, the slot area word names 4003 for the slot areas of the selected template sentence D are called, and collated with target_category[j]. To be more precise, "block number, town name" and "facility name", the slot word category names for the slot areas of the template sentence D, are called, and respectively collated with "block number, town name" of target_category [0] and "facility name" of target_category [2] (S1408). When the number of the slot areas in the template sentence D is the same as that of words in target_word, and the category names of the template sentence D match those of words in target_word (S1409), the required information is decided to be input. Then, this voice input process goes to a reservation screen for "tennis court at Yayoi-Higashi cho 4-chome", where an after-mentioned process of FIG. 16 is done.

Figure 15:
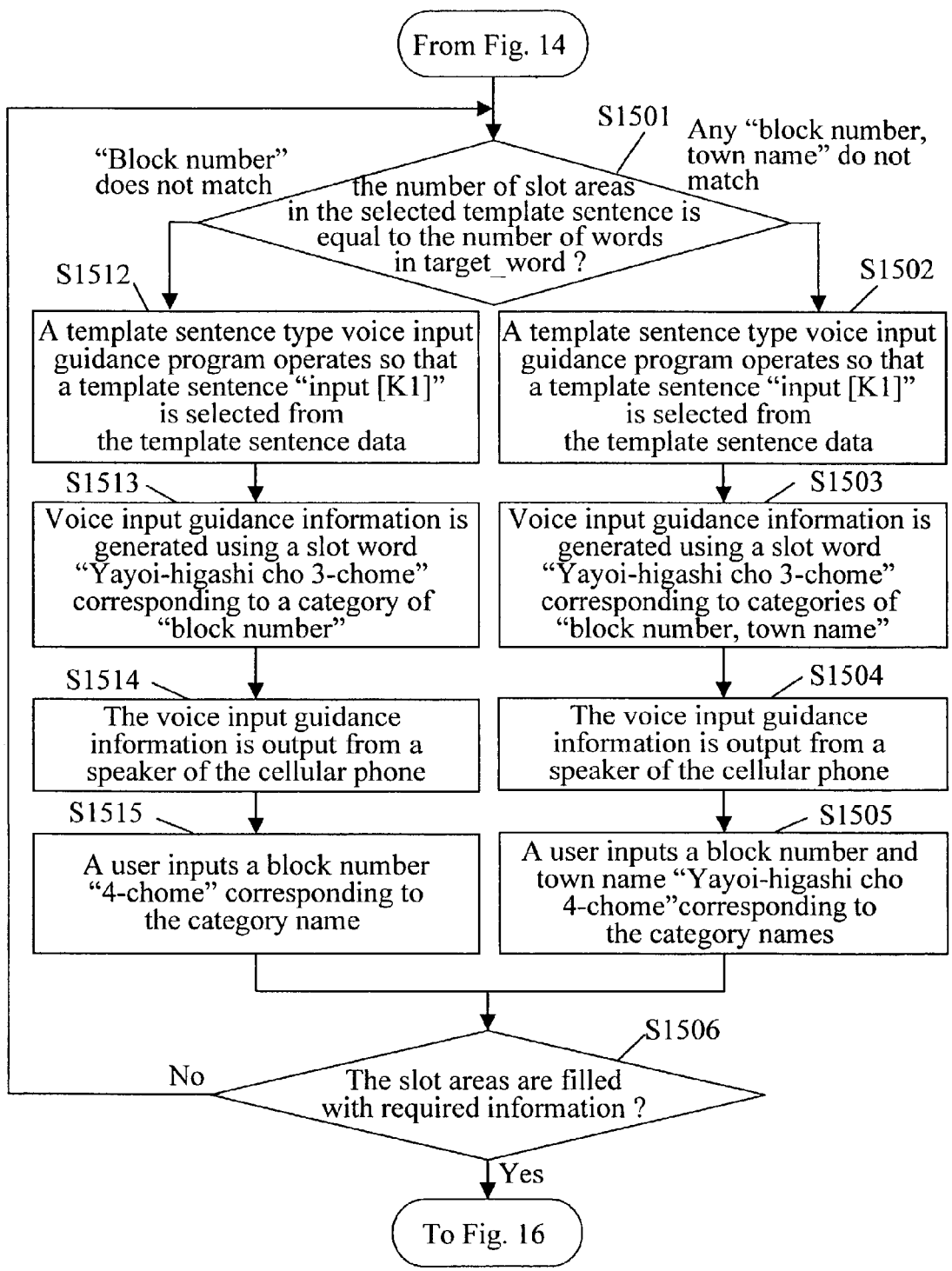
FIG. 15 is an example of a flowchart of a process according to the present invention.
Figure 16:
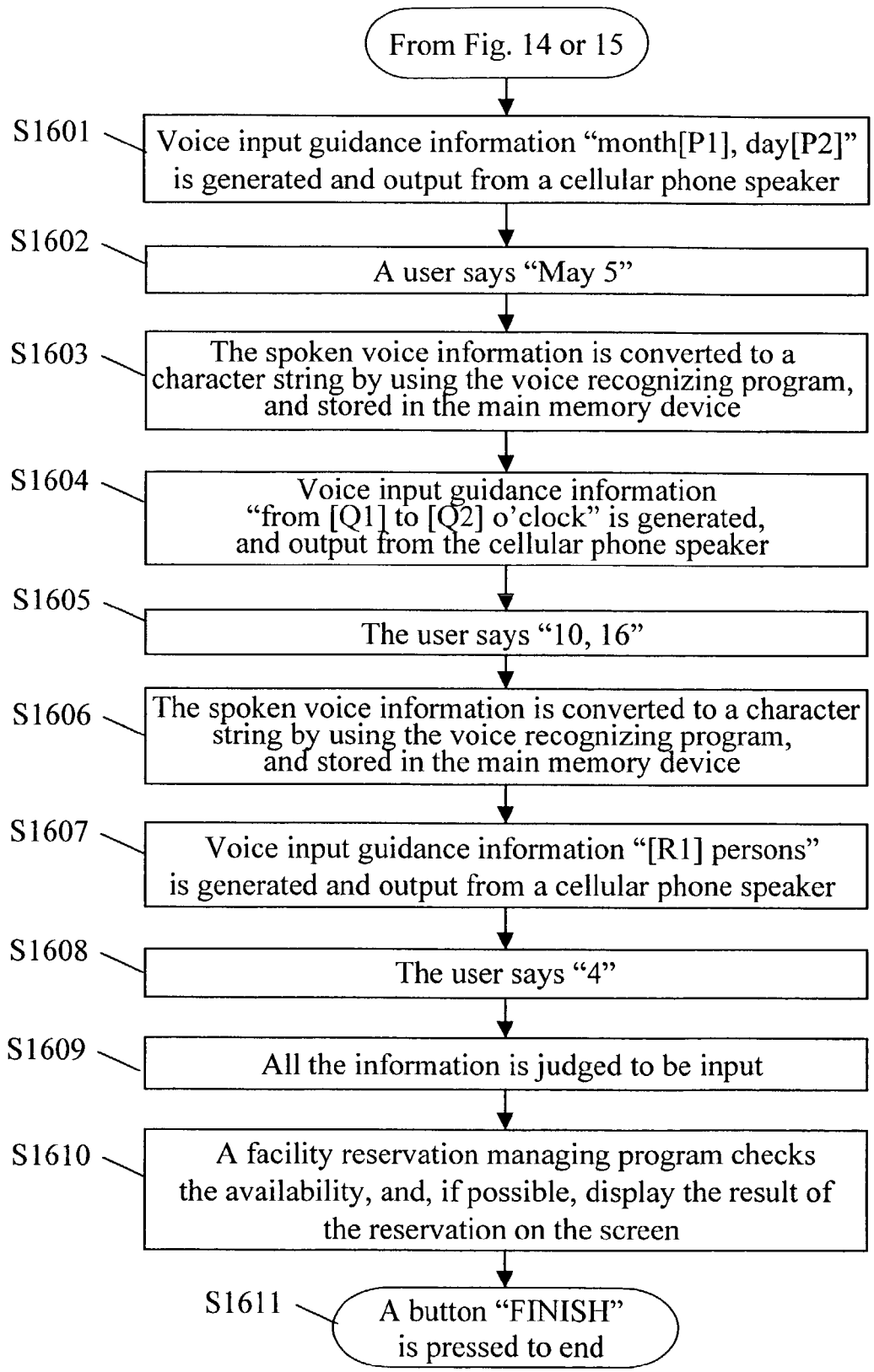
FIG. 16 is an example of a flowchart of a process according to the present invention.

When either [D1] or [D2], for example, only a word "tennis court" is recognized even though the user has said "tennis court at Yayoi-Higashi cho 4-chome", step 1409 goes to a process of FIG. 15. In step 1501 of FIG. 15, like the above-described process, the word names in the word dictionary 20419 are collated with "tennis court", and then "tennis court" is stored in target_word [0] and "facility name" is stored in target_category [0]. Next, like the above-described process, target_category [0] is collated with the character strings of the slot word category names (See FIG. 4) for the template sentence "D". It is judged that the input to the slot area [D2] has been completed when target_category [0] has the same category as the slot number [D2].

Although the two slot areas need to be filled, only the slot area [D1] is not filled in this embodiment. A template sentence W "input [k1]" to prompt the user to input information about "block number, town name", the category name for the slot area [D1], is selected from the template sentence data 20418, so that the template voice input guidance program 20412 operates to prompt a voice input to the slot area [D1] (S1502). Subsequently, template-sentence-type voice input guidance information is generated through the same process as in the case of "reserving [D2] at [D1]" by using slot words "3 Yayoi Higashi cho" corresponding to the category of "block number, town name" (S1503).

Next, the generated template-sentence-type voice input guidance information is transmitted to the cellular phone, and output from the speaker of the cellular phone (S1504). Then, the user inputs "Yayoi-Higashi cho 4-chome" corresponding to the category name "block number, town name" (S1505). When all the information is judged to be input in step 1506, the reservation screen for "tennis court at Yayoi-Higashi cho 4-chome" appears, and a process of FIG. 16 starts.

In step 1501 of FIG. 15, when only a word of the category name "town name" such as "Yayoi-Higashi-cho" is input or recognized, the category name "town name" of the word dictionary corresponding to "Yayoi Higashi cho" is collated with the category names of the slot areas for the template sentence "D". When either the category name "block number" or "town name" in the template sentence data 20418 matches, the template sentence "input [k1]" is selected in the template sentence data 20418 in step 1512. Voice input guidance information is generated through the above-described method (S1513) according to a combination of a slot word "3-chome" corresponding to the slot word category name "block number" and the selected template sentence. The generated information is transmitted to the cellular phone, and output from the speaker of the cellular phone (S1514). Then, when the user says "-chome" (S1515), the voice input is recognized, and converted to a character string "-chome". The character string "-chome" is connected to the character string "Yayoi Higashi cho" previously stored in target_word [0], and then stored in target_word [0] as "Yayoi-Higashi cho 4-chome". Additionally, "block number, town name", the category names in the word dictionary 20419, corresponding to the words in target_word [0] are registered in target_category [0]. Next, the category names "block number, town name" for the slot area [D1] of the template sentence D are collated with target_category [0] (S1506). When the category names match target_category [0] perfectly, all the required information is judged to be input, and the reservation screen for "tennis court at Yayoi-Higashi cho 4-chome" appears. When there is the required information to be input in step 1506, step 1506 returns to step 1501.

Figure 7:
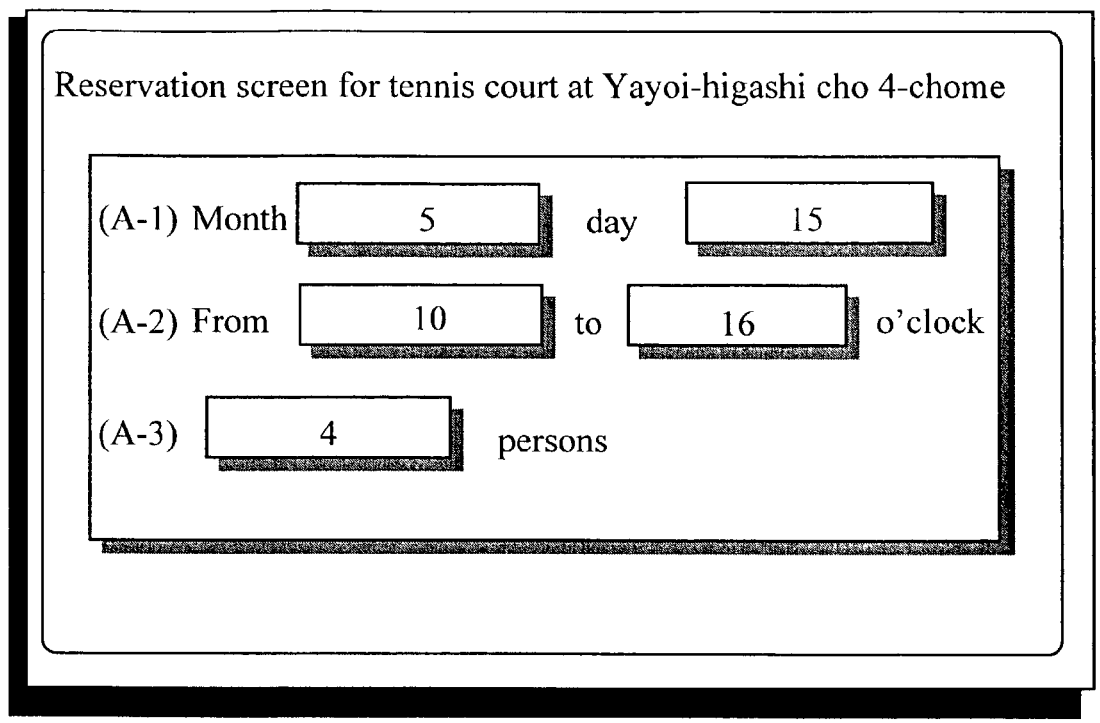
FIG. 7 is an example of a menu display screen.
Figure 8:
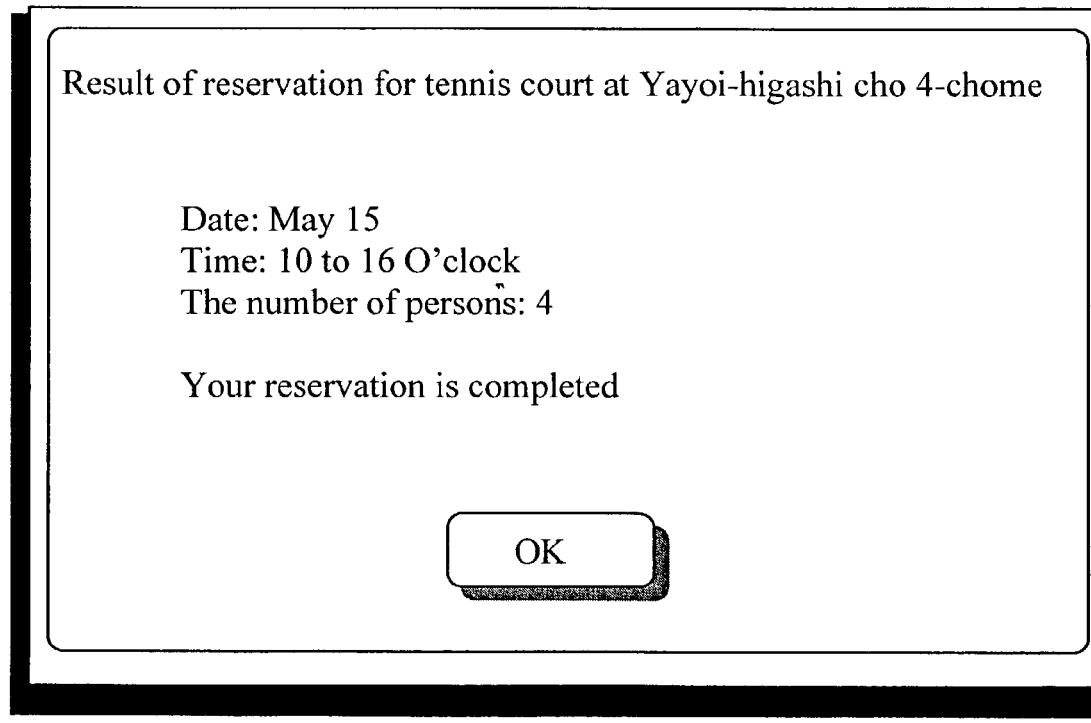
FIG. 8 is an example of a reservation result display screen.

The input contents for the reservation screen of "tennis court at Yayoi-Higashi cho 4-chome" will be described in the following in reference with the screen display of the cellular phone shown in FIGS. 7 and 8 and a flowchart of FIG. 16.

In this example, the user does not select the template sentence menu. When the reservation screen of "tennis court at Yayoi-Higashi cho 4-chome" appears, voice input guidance information of a template sentence "month [P1], day [P2]" is generated in the data processing server 20 (S1601), transmitted to the cellular phone, and output from the speaker of the cellular phone. Following the voice input guidance information, the user says "May 15" for a reservation for May 15, so that the voice information on the slot areas is input through the microphone of the cellular phone (S1602). When there is input including the template areas of the template sentence, such as "month May" and "day 15", the number information and the category information such as "month" and "day" are separately extracted by the voice recognizing program 20414. Therefore, the number information "5" and "15" are respectively registered and stored in data regions for the slot areas [P1] and [P2] on the data processing server as the data of "month" and the data of "day". The input voice information is converted to a character string in the same process in which the above-described "reserving [D2] at [D1]" is converted to the character string. When all information to be input is stored, this process goes to a next step (S1603).

When all the information on the reservation for the date is input, voice input guidance information "from [Q1] to [Q2] o'clock" for a reservation for the time is generated on the data processing server 20 through the above-described method, transmitted to the cellular phone, and output from the speaker (S1604). For the reservation for the time from 10 to 16 o'clock, the user says "10, 16" to input the voice input information on the slot areas through the microphone of the cellular phone 21 (S1605). The voice input information on the starting and ending time "10" and "16" are converted to character strings by the voice recognizing program 20414, and stored in the main memory device 202 (S1606). After the input for the time, the number of persons is input. Voice input guidance information "the number of persons [R1]" is generated through the above-described method (S1607), and output from the speaker of the cellular phone 21 (S1607). When the user says "-chome" (S1608), and all the required information is judged to be input (S1609), the availability is searched on the data processing server 20 by using all the data which have been input on the reservation screen "tennis court at Yayoi-Higashi cho 4-chome" and converted to the character strings through the voice recognition. When the reservation is confirmed to be possible, the result of the reservation is displayed on the screen of the user's cellular phone 21 (S1610). Lastly, when the user presses a button "finish reservation" on the screen, the reservation is finished (S1611), and the web site of AAAA City appears again.

As described above, according to the present invention, the user can confirm a command of the system without viewing information on the screen, guess what information to input, and input using his or her voice without thinking what content to vocalize. Additionally, the user can select one template sentence from the plurality of template sentences by using, for example, the button, and input the contents to the slot areas of the selected template sentence. Therefore, the user can select a requested command by selecting a template sentence, and specify the parameters corresponding to the command by inputting to the slot areas with his or her voice without using, for example, a pointing device.

Further, selecting another template sentence from the menu having plural template sentences that include the slot areas, by using a pointing device or a selecting button, template-sentence identifier data of the selected template sentence is automatically transmitted to data processing server, and thereby the selected template sentence is vocalized. This allows a user to guess what information to input, and input using his or her voice without thinking what content to vocalize.

The foregoing invention has been described in terms of preferred embodiments. However, those skilled, in the art will recognize that many variations of such embodiments exist. Such variations are intended to be within the scope of the present invention and the appended claims.

What is claimed is:

1. A method for acquiring information with voice inputs, comprising the steps of:
   outputting a template sentence including a slot area as sound data, wherein the template sentence except the slot area is voice-synthesized and the slot area comprises a sound of a predetermined time length that is not voice-synthesized;
   receiving voice data including a word corresponding to the slot area of the output template sentence;
   converting the received voice data to a character string through a voice recognition process;
   acquiring a character string corresponding to the word from the character string obtained in the step of converting; and
   wherein said sound is superposed by a sample of a word to be input to said slot area by using a voice.

2. The method for acquiring information with voice input according to claim 1, wherein said slot area has a category as an attribute, and when the category of the slot area matches a category of the word in said character string, the word corresponding to the slot area is acquired.

3. The method for acquiring information with inputs according to claim 1, wherein the sound of the predetermined time length comprises chime or beep.

4. A method for acquiring information with voice input, comprising the steps of:
   receiving an instruction to select one of a plurality of template sentences including slot areas, the template sentences being stored in a memory device;
   producing sound data including voice synthesization of the selected template sentence wherein the slot area of the selected template sentence comprises a sound of a predetermined time length that is not a synthesized word;
   transmitting the produced sound data;
   receiving voice data including a word corresponding to the slot area of the template sentence;
   converting the received voice data to a character string through a voice recognition process;
   acquiring a character string corresponding to the word from the character string obtained in the step of converting; and
   wherein said sound is superposed by a sample of a word to be input to said slot area by using a voice.

5. The method for acquiring information with voice input according to claim 4, wherein said slot area has a category as an attribute, and when the category of the slot area matches a category of the word in said character string, the word corresponding to the slot area is acquired.

6. The method for acquiring information with inputs according to claim 4, wherein the sound of the predetermined time length comprises chime or beep.

7. The method for acquiring information with voice inputs, comprising the steps of:
   outputting a template sentence including a slot area as sound data, wherein the template sentence except the slot area is voice-synthesized and the slot area comprises a sound of a predetermined time length that is not voice-synthesized;
   receiving voice data including a word corresponding to the slot area of the output template sentence;
   converting the received voice data to a character string through a voice recognition process;
   acquiring a character string corresponding to the word from the character string obtained in the step of converting; and
   wherein a time length of the sound replacing said slot area varies according to said slot area.

8. The method for acquiring information with voice input, comprising the steps of:
   receiving an instruction to select one of a plurality of template sentences including slot areas, the template sentences being stored in a memory device;
   producing sound data including voice synthesization of the selected template sentence wherein the slot area of the selected template sentence comprises a sound of a predetermined time length that is not a synthesized word;
   transmitting the produced sound data;
   receiving voice data including a word corresponding to the slot area of the template sentence;
   converting the received voice data to a character string through a voice recognition process;
   acquiring a character string corresponding to the word from the character string obtained in the step of converting; and
   wherein a time length of the sound replacing said slot area varies according to said slot area.

9. A system for acquiring information with voice input, comprising:
   storing means for storing a plurality of template sentences including slot areas, and sound data corresponding to the slot areas;
   voice synthesizing means for converting the template sentence including the slot area to synthesized sound data, wherein the slot area comprises the sound data which is not a voice-synthesized word and which is extracted according to time length data that corresponds to the slot area of the template sentence;

transmitting means for transmitting the synthesized sound data;

receiving means for receiving voice data including a word corresponding to the slot area of the template sentence;

voice recognition means for converting the voice data received by the receiving means to a character string;

word acquiring means for acquiring a character string corresponding to the slot area in the transmitted template sentence from the character string obtained by the voice recognition means; and wherein said sound data corresponding to the slot area is superposed by a sample word to be input to the slot areas by using a voice.

10. The system for acquiring information according to claim 9, wherein a word dictionary that registers words corresponding to said slot areas is provided, and said word acquiring means acquires words corresponding to the slot areas by collating a word in said character string and the words registered in the word dictionary.

11. The system for acquiring information according to claim 10, wherein said sound data corresponding to the slot area has a word category, and said word dictionary has data on word categories, and wherein said word acquiring means acquires a word corresponding the slot area by collating the word category of said slot area and the word category of the word in said character string.

* * * * *

UNITED STATES PATENT AND TRADEMARK OFFICE
CERTIFICATE OF CORRECTION

PATENT NO. : 7,190,770 B2 Page 1 of 1
APPLICATION NO. : 10/206231
DATED : March 13, 2007
INVENTOR(S) : H. Ando et al.

It is certified that error appears in the above-identified patent and that said Letters Patent is hereby corrected as shown below:

ON THE TITLE PAGE

Please correct (30) Foreign Application Priority Data to read as follows:

(30) Foreign Application Priority Data

Feb. <u>18, 2002</u>    (JP)   ................ 2002-040434

Signed and Sealed this

Seventh Day of August, 2007

JON W. DUDAS
*Director of the United States Patent and Trademark Office*